Dec. 23, 1930.   N. E. WHIPPLE   1,786,377

ROAD SANDING DEVICE FOR AUTOMOBILES

Filed May 7, 1930

Nelson E. Whipple
INVENTOR

BY Victor J. Evans
ATTORNEY

Patented Dec. 23, 1930

1,786,377

UNITED STATES PATENT OFFICE

NELSON E. WHIPPLE, OF WINDSOR, NEW YORK

ROAD-SANDING DEVICE FOR AUTOMOBILES

Application filed May 7, 1930. Serial No. 450,561.

This invention relates to new and useful improvements in road sanding devices for motor vehicles and has for the primary object, the provision of a device of the above stated character under the control of the operator of the motor vehicle, whereby sand or like material may be dispensed in advance of the rear wheels of the vehicle when starting or stopping the latter to permit the wheels to obtain traction when travelling over slippery roadways, caused by rain, snow or ice and thereby reduce the chance of skidding to a minimum and also obviate the possibility of the vehicle becoming stalled for want of traction by the rear wheels.

Another object of this invention is the provision of a road sanding device of the above stated character which may be easily and quickly applied to a motor vehicle under construction or one now in use, without altering the usual construction of the vehicle and which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which.

Figure 1:
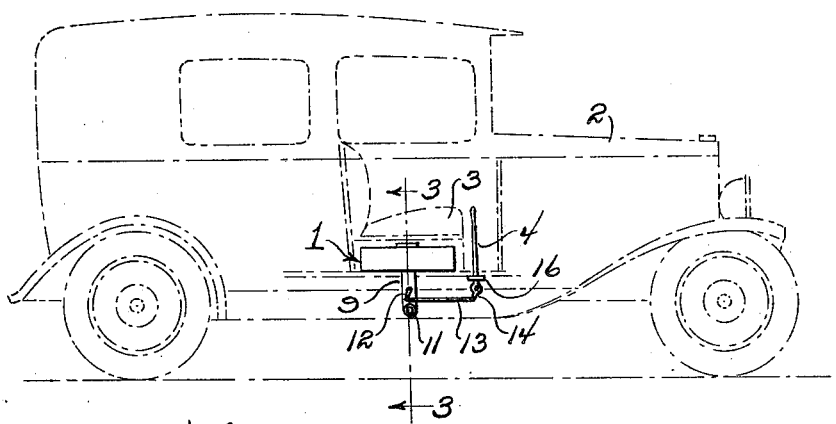
Figure 1 is a side elevation illustrating a sanding device applied to a motor vehicle and constructed in accordance with my invention.
Figure 2:
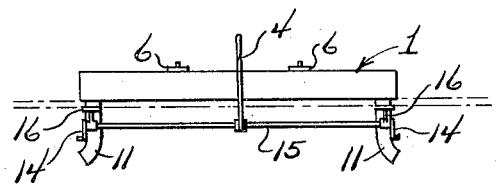
Figure 2 is a front elevation illustrating the device.
Figure 3:
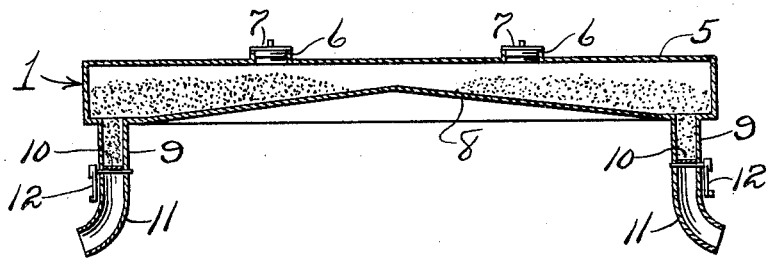
Figure 3 is a sectional view taken on the line 3—3 of Figure 1.

Referring in detail to the drawing, the numeral 1 indicates as an entirety a sanding device which may be applied to a motor vehicle 2 at any suitable place and to provide a clear understanding as to the construction and operation of my invention, I have elected to position the device under the front seat 3 with the control lever 4 conveniently arranged, whereby the operator may actuate the device when desired to dispense sand or like material in the path of the rear wheels of the vehicle.

A tank or reservoir 5 is positioned under the front seat 3 and is provided with filling necks 6 normally closed by removable caps 7 having threaded engagement with the necks 6. The bottom wall 8 of the tank or reservoir 5 is inclined upwardly from each end of the tank towards the intermediate portion of the tank for the purpose of causing the sand or like material to gravitate towards the disscharge pipes 9 that are provided with control valves or gates 10 and angularly related discharge ends of nozzles 11 located in advance and in alignment with the rear wheels of the vehicle 2.

Arms 12 are secured to the gates or valves 10 and are pivotally connected to links 13 that are in turn pivotally connected to angularly related arms 14 formed on an operating rod 15. The rod 15 is journaled in brackets 16 secured to the vehicle 2 and the rod extends transversely of the vehicle as clearly shown in the drawing and has secured thereto the operating lever 4 which extends upwardly through the floor boards of the vehicle in convenient reach of the operator of the vehicle.

In operation, the operator of the vehicle may dispense the sand or like material to the road-way in advance of the rear wheels by moving the lever 4 in one direction and discontinue the supply of sand by moving the lever in a reverse direction. This device is especially adapted for use when the rear wheels are unable to obtain traction caused by a slippery roadway and with the sand dispensed in the path of the rear wheels, the latter are prevented from skidding or slipping, consequently providing a device that will aid in starting vehicles when stalled or when stopping them on slippery roadways.

While I have shown and described the preferred embodiment of my invention, it will be understood that minor changes in construction, combination and arrangement of parts may be made without departing from the spirit and scope of the invention as claimed.

Having thus described my invention, what I claim is:

A road sanding device for automobiles comprising an elongated supply tank mounted under the front seat of an automobile and having the bottom wall inclined upwardly from each end of said tank toward the intermediate portion thereof to cause gravitation of the sand in the tank toward each end thereof, discharge pipes in communication with the ends of the tank and having the discharge ends thereof disposed a considerable distance in advance and in alinement with the rear wheels of the automobile to permit the sand to strike and spread on the roadway before being engaged by the rear wheels, valves in said pipes, and a control means for the valves to regulate and discontinue the flow of sand from the pipes as desired.

In testimony whereof I affix my signature.

NELSON E. WHIPPLE.